United States Patent [19]

Kotani et al.

[11] Patent Number: 4,916,732
[45] Date of Patent: Apr. 10, 1990

[54] COMMUNICATION SYSTEM HAVING TELEPHONIC FUNCTION

[75] Inventors: Matahira Kotani, Nara; Motohiko Hayashi, Yamatokoriyama, both of Japan

[73] Assignee: Sharp Kabushiki Kaisha, Nara, Japan

[21] Appl. No.: 251,764

[22] Filed: Sep. 30, 1988

[30] Foreign Application Priority Data

Sep. 30, 1987 [JP] Japan .................. 62-247635

[51] Int. Cl.[4] ............ H04M 11/00; H04N 1/32
[52] U.S. Cl. .................. 379/100; 379/93; 379/110; 358/440
[58] Field of Search ............ 379/100, 93, 96-98, 379/110; 358/257, 440

[56] References Cited

U.S. PATENT DOCUMENTS 4,754,335  6/1988  Izawa et al. ............ 379/100

FOREIGN PATENT DOCUMENTS 0134552  7/1985  Japan ..................... 379/100
655553   3/1987  Japan .
2136246  9/1984  United Kingdom ....... 379/96

Primary Examiner—Jin F. Ng
Assistant Examiner—Wing F. Chan
Attorney, Agent, or Firm—Birch, Stewart, Kolasch & Birch

[57] ABSTRACT

A communication system having a telephonic function suitably adopted for a facsimile system, in which a telephone module includes: a cell signal selecting circuit connected to a telephone line, for selecting and receiving station call signals; a key board having input/output lines of two systems, one for outputting receiving station information to the call signal selecting circuit and another for a facsimile module; switches interposed in lines between the key board and the cell signal selecting circuit, functioning so as to be shut off during the operation of the facsimile module and to be conductive during the non-operation thereof; third system lines individually connected to lines between the respective switches and the call signal selecting circuit; and photocouplers for electrically isolating each of the third system lines during the non-operation of the facsimile module and making the third system lines conductive during the operation thereof, and for inputting the receiving station information to the call signal selecting circuit.

13 Claims, 2 Drawing Sheets

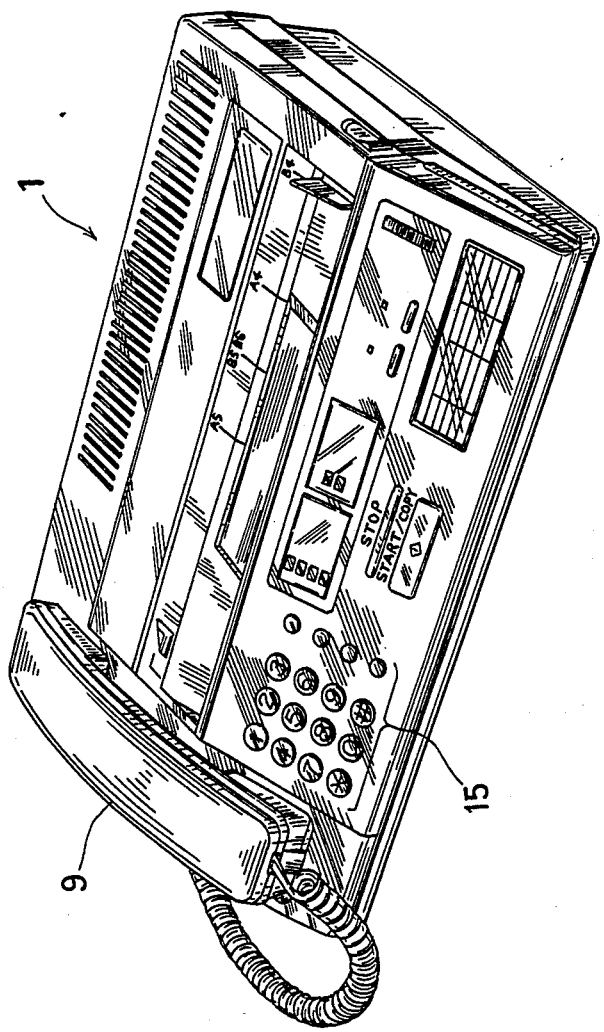

COMMUNICATION SYSTEM HAVING TELEPHONIC FUNCTION

BACKGROUND OF THE INVENTION

1. Field of the Invention

The present invention relates to a communication system having a telephonic function which is suitable for application with a facsimile system having a telephonic function and also a so-called auto-dialing function. This enables a user to automatically effect a series of processes ranging from designation of a receiving station to termination of subsequent transmission of a manuscript to a personal computer, having a telephonic function, for transmitting information via a telephone line.

2. 2. Description of the Prior Art

A facsimile system having an auto-dialing function and also a telephonic function normally incorporates a facsimile module including a modem unit (a conversion unit for modulating and demodulating carrier signals which are transmitted and received via a telephone line). The facsimile module further includes a key input unit designed for dialing, a DP (dial impulse) signal generating unit and a PB (push button) signal generating unit. The DP signal generating unit and the PB signal generating unit are controlled in accordance with selection signals generated by a selection signal generating unit incorporated into the facsimile module; and thus a PB signal or a DP signal is transmitted, depending on which is required, to reach a particular destination calling number.

A telephone module is also equipped with another key input unit and a selection signal generating unit. When utilizing the facsimile system as a telephone, the selection signal generating unit incorporated into the telephone module serves to control the DP signal generating unit or the PB signal generating unit.

The reason why the facsimile module and the telephone module are in overlap, being equipped with the key input unit and the selection signal generating unit respectively, lies in the purposes for permitting the use of only the telephone module in the case of stoppage of electric current and for preventing noises from entering the telephone line by electrically isolating the telephone module from other units.

In the prior art, therefore, the key input units and the selection signal generating units must be duplicated this leads to higher manufacturing cost.

In order to obviate the above-described problems, a "telephone-built-in facsimile system" disclosed in Japanese Patent Laid-Open Publication No. 65553/1987 is constructed in such a way that a key board of the facsimile system serves as dialing keys, and a change-over circuit supplies dialing signals directly to a telephone circuit when a control circuit is brought into a non-operative state (off state) under control of the control circuit of the facsimile system. There is not, however, disclosed definitive change-over means for electrically isolating the telephone module from the facsimile module. Hence, the means for sharing the key input unit and the selection signal generating unit, and for changing over these units to an isolated state as required has not yet been invented.

SUMMARY OF THE INVENTION

The present invention provides a communication system having a telephonic function, composed of a telephonic communication module and an information transmitting module in which the telephonic communication module comprises: call signal selecting means for selecting a receiving station call signal to be connected to a telephone line; input operating means having a first system of input/output lines connected to the call signal selecting means and a second system of input/output lines connected to the information transmitting module for outputting a receiving station's information through the output lines in the first and second systems; change-over means interposed in the output lines of the first system which functions so as to be shut off when receiving an operative signal from the information transmitting module and to be connected again when receiving a non-operative signal from the information transmitting module; a third system of input lines connected to each of the output lines in the first system between the change-over means and the call signal selecting means, to which a receiving station's information from the information transmitting module is inputted; and a plurality of switching means interposed in the third system which functions so as to be electrically shut off when receiving an operative signal from the information transmitting module and to be connected when receiving a non-operative signal rom the information transmitting module.

The input operating means includes a plurality of keys arranged in a matrix and is preferably constructed to have a dual switching mechanism by which each key is capable of outputting the signals to the output lines of the first and second systems. The change-over means and the switching means are preferably composed of photocouplers.

According to the present invention, when not supplying the information transmitting module with electric power, the output of the input operating means is imparted, via the input lines of the first system, the output lines of the first system and the change-over means to the call signal selecting means. When supplying the information transmitting module with electric power, the output of the input operating means is imparted via the input lines of the second system, the output lines of the second system, the information transmitting module and the input lines of the third system to the call signal selecting means. At this point, the information transmitting module controls the plurality of switching means on the basis of the thus imparted output of the input operating means. The information transmitting module further shuts off and supplies the signals conceived as the receiving station information to the call signal selecting means from those switching means.

Based on the constitution of the present invention, it is therefore possible to use a common unit both as the call signal selecting means and as the input operating means, which are defined as the principal part of dialing means and are conventionally separately provided in the information transmitting module and the telephonic communication module, respectively. This arrangement allows for less manufacturing cost for the communication system having a telephonic function. In addition, the information transmitting module can be isolated electrically from the telephonic communication module when the information transmitting module is not operating, and it is also possible to prevent noise from entering the telephone line.

Other objects and advantages of the invention will becomes more apparent during the following discussion with reference to the accompanying drawings.

DESCRIPTION OF THE DRAWINGS

FIG. 2 is a perspective view illustrating the external appearance of the embodiments of the present invention.

DESCRIPTION OF THE PREFERRED EMBODIMENTS

Figure 1:
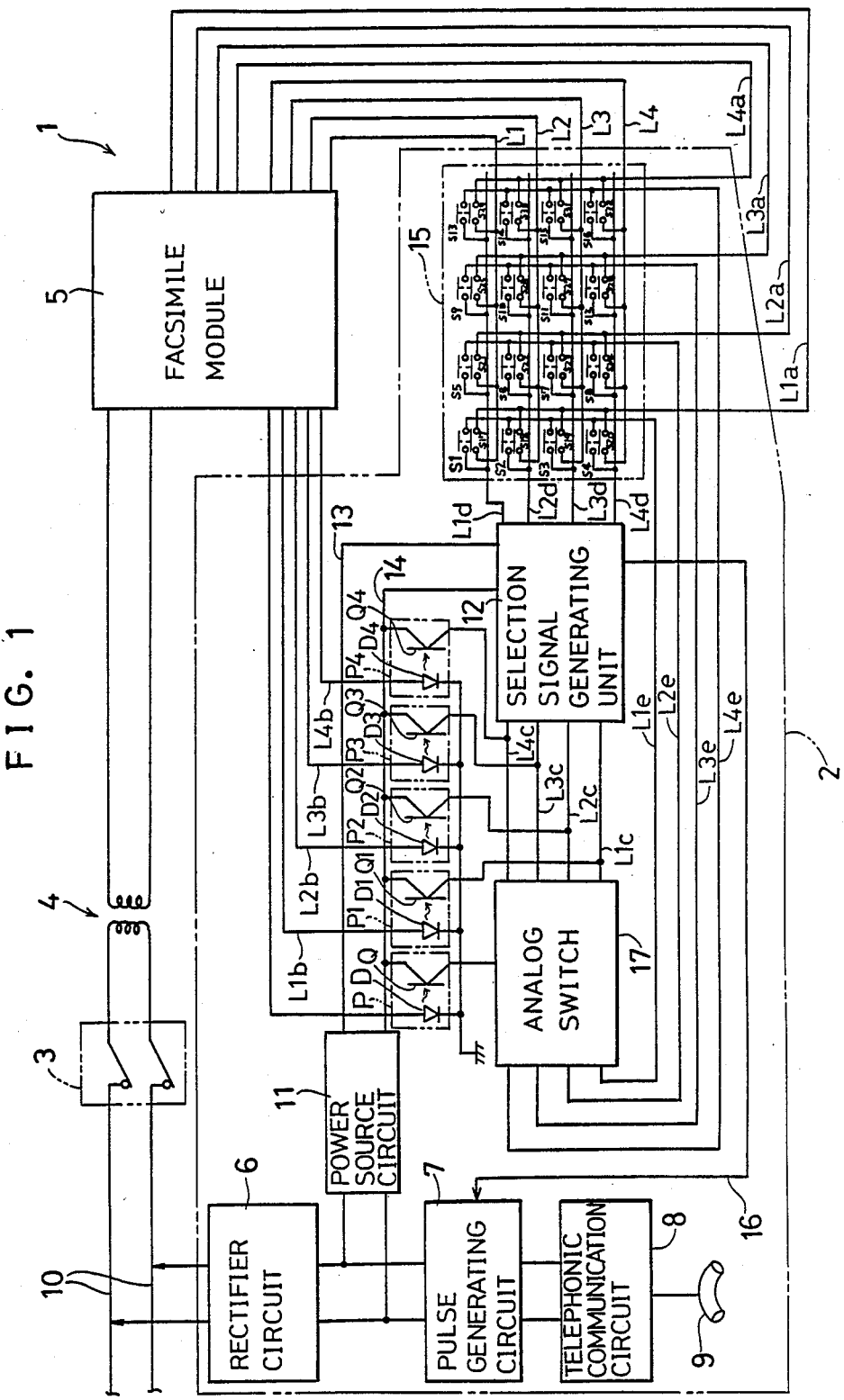
FIG. 1 is a block diagram illustrating the fundamental construction of the call signal generating unit which is the principal part of a facsimile system in embodiments of the present invention.

Referring to FIG. 1, illustrating the telephone-built-in facsimile system 1 developed as a communication system having a telephonic function. The facsimile system 1 essentially consists of a telephone module and a facsimile module.

A telephone line 10 is connected to the telephone module 2 defined as the telephonic communication module and is also connected through a relay unit 3 and a transformer 4 to a facsimile module 5, defined as the information transmitting module. The relay unit 3 is so driven as to be conductive when the facsimile module 5 allows the facsimile system 1 to be utilized for facsimile communication. At this time, the facsimile system 1 cannot be employed for telephonic communication. The telephone module 2 incorporates a pulse generating circuit 7 for generating a DP (Dial impulse) signal when using a dial line and a PB (push button) signal when using a push-button dial telephone line, and a telephonic communication circuit 8 to which a hand set 9 is connected. A change-over switch (not illustrated) serves to trigger the DP signal/PB signal change-over on the signals generated by the pulse generating circuit 7.

A rectifier circuit 6 is connected to a power source circuit 11 for taking electric power out of the telephone line 10 and supplying the operating electric power via lines 13 and 14 to a selection signal generating unit 12, conceived as the call signal selecting means. The selection signal generating unit 12 generates a predetermined signal when an operator manipulates an operation panel 15 defined as input operating means. This signal is transmitted via line 16 to the pulse generating circuit 7. The power source circuit 11 takes its electric power from the telephone line 10 and is therefore capable of providing the selection signal generating unit 12 with the electric power even in the case of power suspension. The pulse generating circuit 7 and the selection signal generating unit 12 are both combined to form the dialing means.

The operation panel 15 including input/output lines of two systems is composed of a key board having a plurality of keys arranged in matrix. Totally 16 pieces of contacts S1 to S16 are provided at intersections between input lines L1d to L4d and output lines L1e to L4e of the first system. Similarly, 16 pieces of contacts S17 to S32 are provided at intersections between input lines L1 to L4 and output lines L1a to L4a of the second system. The contacts S1 and S17 cooperate to constitute a dual switching mechanism which is simultaneously opened or closed by operating one common key. From the thus constituted operation panel 15 the signals can be outputted in 16 different kind of ways. The input lines L1d to L4d of the first system are connected to the selection signal generating unit 12, while the output lines L1e to L4e are connected to an analog switch 17 serving as the change-over means. The input lines L1 to L4 of the second system are connected to the facsimile module 5, and the output lines L1a to L4a are likewise connected to the facsimile module 5.

The analog switch 17 is connected via the common lines L1c to L4c to the selection signal generating unit 12 and is further connected through a photo-transistor Q to line 14. A light emitting diode D is disposed corresponding to the photo-transistor Q, and the diode D and the transistor Q are combined to form a photocoupler P. When power is supplied to the facsimile module 5, the light emitting diode D remains conductive, and hence the photo-transistor Q is also in the conductive state. The analog switch 17 shuts off during the conduction of the photo-transistor Q but is made conductive when the transistor Q shuts off.

The common lines L1c to L4c are respectively connected via photo-transistors Q1 to Q4 defined as the switching means to the line 14. Light emitting diodes D1 to D4 are disposed corresponding to the photo-transistors Q1 to Q4, which cooperate to constitute photocouplers P1 to P4. Signals conceived as receiving station information are imparted from the facsimile module 5 via lines L1b to L4b, which serve as third input lines, to the light emitting diodes D1 to D4, thereby controlling their conduction and shut-off. When the light emitting diodes D1 to D4 are made conductive or shut off, the photo-transistors Q1 to Q4 are concomitantly made conductive or shut off.

The lines L1b to L4b are provided so as to correspond to the lines L1a to L4a of the second system. Hence, if the signal is led to, for instance, the output line L2a, the facsimile module 5 correspondingly outputs the signal to the line L2b, thus making the light emitting diode D2 conductive. As a result of this, the photo-transistor Q2 is also put into the conductive state, and it follows that the signal is led to the common line L2c.

The selection signal generating unit 12 generates selection signals corresponding both to the signals parallelly given to the input lines L1d to L4e of the first system and to the signals parallelly given from the common lines L1c to L4c, and imparts these selection signals to the pulse generating circuit 7. Subsequently, the pulse generating circuit 7 generates DP/PB signals corresponding to the thus imparted signals.

While power is supplied to the facsimile module 5 (input/output lines of the second system are used), the analog switch 17, as described above, shuts off, and therefore the output lines L1e to L4e of the first system are not connected to the common lines L1c to L4c. The signals supplied via the common lines L1c to L4c to the selection signal generating unit 12 are regarded as signals given from the photocouplers P1 to P4. It is thus possible to establish the electrically conductive state between the facsimile module 5 and the telephone module 2 with the aid of the analog switch 17 and the photocouplers P1 to P4.

During power suspension (input/output lines of the first system are used), the light emitting diode D is shut off, at which time the analog switch 17 conducts electricity while the relay unit 3 is shut off. When the analog switch 17 comes into the conductive state, the operation panel 15 transmits the signals through the lines L1d to L4d the lines L1e to L4e and the common lines L1c to L4c to the selection signal generating unit 12. The relay unit 3 is then shut off, whereby the facsimile system 1 comes to have a telephonic function alone. In this case, when a call number is inputted by operating the operation panel 15, the selection signal generating unit 12 outputs a signal corresponding to the inputted call number to the pulse generating circuit 7. The pulse generating circuit 7 in turn generates the corresponding DP/PB signal. When the line is connected to a telephone (not illustrated) of the receiving station, the telephonic communication may be provided by use of the hand set 9.

Where the system is utilized as a facsimile at the power source supplying time, the call number of the receiving station is inputted by operating the operation panel 15. Then, the signals are imparted via the input lines L1 to L4 of the second system, the output lines L1a to L4a, the facsimile module 5, the lines L1b to L4b, the photocouplers P1 to P4 and the common lines L1c to L4c to the selection signal generating unit 12. The selection signal generating unit 12 outputs the signal corresponding to the inputted call number to the pulse generating circuit 7. The pulse generating circuit 7 generates the DP/PB signal corresponding to the thus outputted signal. On connecting the line to a receiving facsimile system (not shown), the facsimile module 5 initiates the transmission of a manuscript.

In the embodiment given above, the analog switch 17 is shut off when inputting the power source, and the signals are inputted via the input/output lines of the second system, the facsimile module 5 and the photocouplers P1 through P4 to the selection signal generating unit 12. At this time, it is possible to establish the conductive state between the facsimile module 5 and the telephone module 2. When power suspension occurs, the analog switch 17 is made conductive, and the signals are inputted via the input/output lines of the first system, the analog switch 17 and the common lines L1c through L4c to the selection signal generating unit 12. Even in the case of power suspension, the facsimile system 1 is capable of performing its telephonic function, and is at the same time electrically isolated from the telephone module 2. On the basis of the above-described constitution, the dialing means of the facsimile module 5 can be shared with the telephone module 2. This results in a reduction in manufacturing cost for the facsimile system 1. If power suspension occurs, the facsimile system is electrically isolated when employing the telephone, so that it is feasible to prevent the noises from entering the telephone line.

Note that FIG. 2 illustrates an external appearance of the facsimile system 1, wherein the numeral 9 designates a hand set and 15 represents a key input unit serving as input operating means.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or the spirit of the invention.

What is claimed is:

1. A communication system having a telephonic function and including a telephonic communication module and an information transmitting module, the system comprising:
   call signal selecting means for selecting a call signal to be outputted to a telephone line,
   input operating means having a first set of input and output lines connected to the call signal selecting means and a second set of input and output lines connected to the information transmitting module, for outputting information through the output lines in the first and second set,
   change-over means, interposed in the output lines of the first set, being disabled, upon receipt of an operative signal from the information transmitting module and for enabling said first set of input and output lines to be conductive when receiving a nonoperative signal from the information transmitting module,
   a third set of input and output lines connected to each of output lines in the first system between the change-over means and the all signal selecting means, for inputting information from the information transmitting module, and
   a plurality of switching means interposed in the third set of input and output lines, for inputting the information to the call signal selecting means when receiving an operative signal from the information transmitting module, and for electrically shutting off the third system input lines when receiving a non-operative signal from the information transmitting module.

2. A communication system having a telephonic function as claimed in claim 1, in which the input operating means are composed of a plurality of keys arranged in a matrix, each of the keys being constructed to have a dual switching mechanism capable of outputting signals to the output lines of the first and second sets.

3. A communication system having a telephonic function as claimed in claim 1, in which the change-over means comprises a photocoupler consisting of a light emitting diode and a photo-transistor and an analog switch connected to the photo-transistor.

4. A communication system having a telephonic function as claimed in claim 1, in which the switching means are composed of photocouplers each consisting of a light emitting diode and a photo-transistor.

5. A method of electrically isolating a telephone module from an information transmitting module in an integrated telephone-information transmitting system comprising an input means with a first and a second set of output lines; an information transmitting module connected to said second set of output lines, a switch connected to said information transmitting module; a change-over means connected to said first set of output lines and said information transmitting module and a third set of output lines connecting said switch and said change-over means to a selecting signal generating means, the method comprising the steps of:
   inhibiting power to said information transmitting module;
   inputting a set of connection signals, to connect said telephone module to a remote telephone module, through said first and second set of output lines of said input means;
   transmitting said set of connection signals through said first set of output lines to said change-over means;
   transmitting said set of connection signals through said third set of output lines from said change-over means, being enabled in response to power not being supplied to said information transmitting module, to said selecting signal generating means;
   inhibiting said set of connections signals through said second set of output lines by use of said switching means, which becomes non-conductive in response to power not being supplied to said information transmitting module, thereby isolating said telephone module from said information transmitting module; and selecting and outputting telephone connection signals, selected by said selecting signal generating means in response to said set of connection signals received from said change-over means.

6. A method, as claimed in claim 5, wherein said information transmitting module is a facsimile module and said method is for isolating a telephone module in an integrated telephone-facsimile apparatus.

7. A method, as claimed in claim 5, wherein said change-over means comprises an analog switch and a photocoupler, said photocoupler being connected to said information transmitting module so as to control said analog switch of said change-over means to be conductive when said information transmitting module is not powered and to be non-conductive when said information transmitting module is powered.

8. A method as claimed in claim 5, for subsequently isolating said information transmitting module from said telephone module, further comprising the steps of:

supplying power to said information transmitting module;

transmitting said set of connection signals through said second set of output lines to said switch means;

transmitting said set of connection signals through said third set of output lines from said switch means, being conductive in response to power being supplied to said information transmitting module, to said selecting signal generating means;

inhibiting said set of connection signals through said first set of output lines by use of said change-over means, which becomes disabled in response to power being supplied to said information transmitting module, thereby isolating said information transmitting module from said telephone module; and selecting and outputting information transmitting connection signals, selected by said selected signal generating means in response to said set of connection signals received from said switching means.

9. A communication means for isolating a telephone module from a facsimile module in an integrated facsimile-telephone system, comprising:

call signal selecting means for selecting and outputting one of a telephone call connection signal and a facsimile call connection signal;

input means, having a first and second set of output lines, for inputting connection signals to said call signal selecting means;

change-over means, operatively connected to said first set of output lines from said input means and operatively connected to said facsimile module;

switch operatively connected to said second set of output lines from said input means and operatively connected to said facsimile module;

a third set of output lines, operatively connecting either of said change-over means and said switch means to said call signal selecting means;

said change-over means, being enabled when power is not supplied to said facsimile module and being disabled when power is supplied to said facsimile module, for supplying said connection signals from said first set of output lines to said call signal selecting means upon being enabled and inhibiting said connection signals upon being disabled;

said switch being conductive when power is supplied to said facsimile module and being nonconductive when power is not supplied to said facsimile module, for transmitting connection signals from said second set of output lines to said call signal selecting means upon being conductive and inhibiting said connection signals upon being nonconductive;

said call signal selecting means for selecting and outputting a telephone call connection signal when connection signals are received from said change-over means and for selecting and outputting a facsimile call connection signal when connection signals are received from said switching means, thereby allowing said system to isolate the telephone module when power is inhibited to the facsimile module and allowing said system to isolate the facsimile module when power is supplied to the facsimile module.

10. A system, as claimed in claim 9, wherein said switch comprises a plurality of photocouplers.

11. A system, as claimed in claim 10, wherein each of said photocouplers comprises a diode and a photo-transistor.

12. A system, as claimed in claim 9, wherein said change-over means comprises a photocoupler and an analog-switch.

13. A system, as claimed in claim 9, wherein said input means comprises a plurality of keys arranged in a matrix, each of said keys having a dual switching mechanism capable of outputting connection signals to both the first and second sets of output lines.

* * * * *